Jan. 4, 1949. W. D. ABBOTT 2,457,967
HIGH VELOCITY MOTOR VENTILATION
Filed Nov. 21, 1946

WITNESSES:

INVENTOR
Ward D. Abbott.
BY
ATTORNEY

Patented Jan. 4, 1949

2,457,967

UNITED STATES PATENT OFFICE 2,457,967

HIGH VELOCITY MOTOR VENTILATION

Ward D. Abbott, Orchard Park, N. Y., assignor to Westinghouse Electric Corporation, East Pittsburgh, Pa., a corporation of Pennsylvania Application November 21, 1946, Serial No. 711,328

10 Claims. (Cl. 171—252)

1

My invention relates to adequate and economical motor-ventilation, and it has particular relation to the problem of ventilating the larger frame-sizes in a new line of squirrel-cage industrial motors, although certain principles of the invention are applicable also to other machines.

Tests of known cooling methods have failed, particularly in the larger frame-sizes of drip-proof protected squirrel-cage motors and splash-proof protected squirrel-cage motors, when an attempt has been made to rerate these motors in an effort to obtain the highest possible rating for any given frame-size. These tests have shown temperatures which were far above the temperatures which are allowable on protected motors, thus indicating the necessity for some new approach to the cooling-problem.

An important object of my invention is to provide a dual-ventilation arrangement, for motors, in which a single-end ventilation is provided, producing an axial airflow over the stator-core, in stator-ducts inside of the stator-frame, in combination with a recirculation ventilating-system in which air is circulated in the same direction, through the same stator-ducts, with a return-path back through rotor-ducts. In this manner, I produce high air-velocities in the stator-ducts, and also in the annular spaces surrounding the end-turns of the stator-winding, thus increasing the heat-dissipation from these parts, without requiring a large volume of single-end-ventilating air, and without encountering a large pressure-head to force air through the perforations in the brackets of the motor. My improved construction also makes possible the use of a small-diameter blower for the single-end ventilation which draws the air in through one bracket, over the back of the stator-core, and out of the other bracket. The small blower-diameter makes handling easier, during the course of manufacture. The motor is much quieter than could normally be expected, for single-end ventilation, and the fewer and less complicated parts make the motor cheaper than the conventional double-end-ventilated motor.

With the foregoing and other objects in view, my invention consists in the parts, structures, combinations and systems hereinafter described and claimed, and illustrated in the accompanying drawing, wherein:

2

Figure 1:
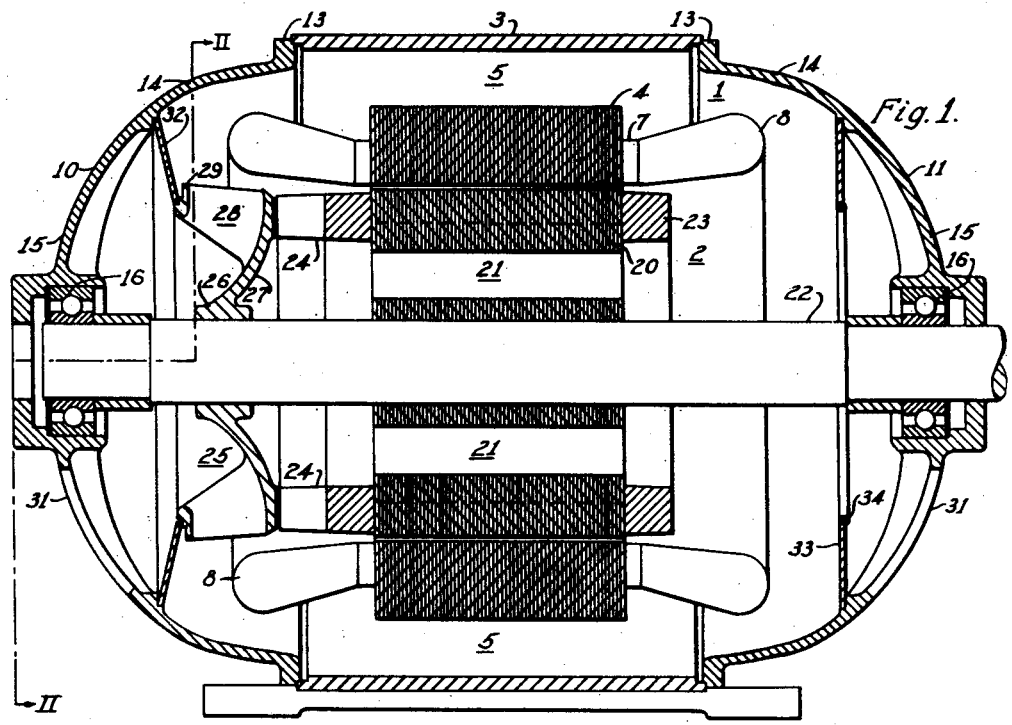
Figure 1 is a longitudinal sectional view of my improved motor.
Figure 2:
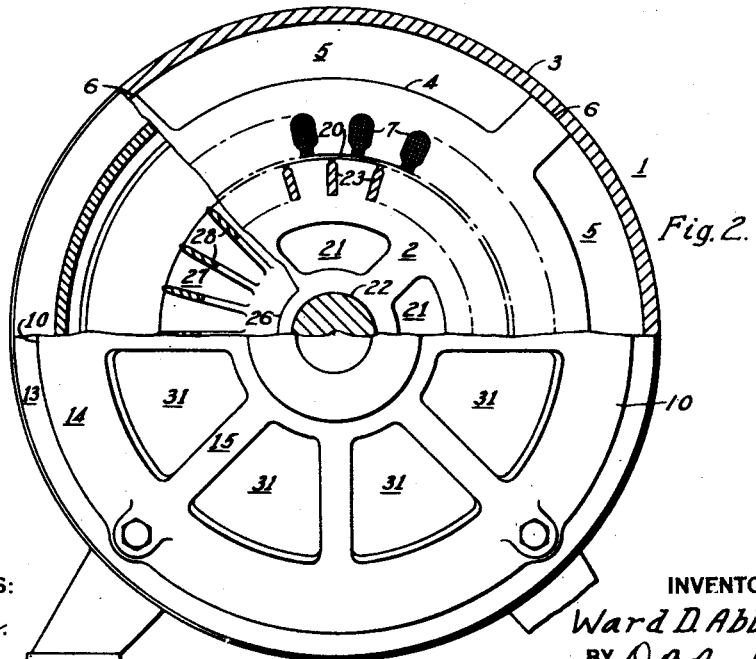
Fig. 2 is an end view, partly in a central transverse section, and partly in a section through the blower, on the line II—II in Fig. 1.

My invention is illustrated in connection with a dynamo-electric machine, in the form of a protected squirrel-cage motor comprising a stator-member 1 and a rotor-member 2. The stator-member has a stator-frame 3, which is illustrated in the form of a strong rigid frame-ring, which comprises an outer enclosure-member which is spaced radially from the major portion of the outer periphery of the stator-core 4, thus defining a plurality of axially extending stator-ventilating ducts 5 which admit of an axial airflow over the stator-core from one end of the core to the other. The laminations of the stator-core 4 make contact with the stator-frame 3 at a plurality of spaced points 6 (Fig. 2) about the outer periphery of the stator-laminations, within the inside of the frame-ring, the stator-laminations being spaced from the inside of the frame-ring at other peripheral points, thus defining the stator-ducts 5. The stator-core carries a stator-winding 7, having end-turns 8.

The stator-frame 3 is associated with two perforated brackets 10 and 11, which are mounted, one at each end of the stator-frame. For economy in manufacture, it is usually desirable that the two brackets 10 and 11 shall be identical. Each bracket is shown as having a registering peripheral portion 13 in air-enclosing relation to that end of the frame-ring 3, and having an adjacent peripheral portion 14 of smaller diameter than said registering peripheral portion 13. Each of the brackets 10 and 11 also has an end-portion 15 which carries a centrally located bearing 16.

The rotor-member 2 has a rotor-core 20, which is provided with a plurality of axially extending rotor-ducts 21. The rotor-member also has a shaft 22 which is supported by the bearings 16. The rotor-core 20 carries a cast squirrel-cage winding 23. By the word "cast," I mean to include brazing or any other forming process for producing a molecularly integral structure.

In accordance with my invention, I equip the rotor-member 2 with two internal blower-means, which, in the illustrated embodiment of my invention, are both mounted at the intake-end of the machine, the essential thing about these blower-means being that one of them produces the single-end ventilating-flow, while the other produces an internal recirculation which increases the air-velocity in the stator-ducts 5.

The recirculating blower-means comprises a plurality of axially extending recirculation-inducing blades 24, which are cast integral with the squirrel-cage end-ring at the air-inlet end of the machine.

The single-end ventilating-means, or the end-to-end-flow blower-means, is illustrated in the form of a cast blower 25, having an integral hub 26 which is mounted on the shaft 22. The single-end blower 25 also has an integral blade-supporting shroud 27, which carries a plurality of integral blades 28. The outer ends of these blades 28 carry an integral outer shroud 29. The peripheral portion of the blade-supporting shroud 27 is close to the ends of the recirculation-inducing blades 24.

The brackets 10 and 11 have ventilating-perforations 31 which are disposed near the bearings 16, these perforations being usually limited to the lower hemisphere of the bracket, in drip-proof designs. At all other portions, the brackets 10 and 11 are imperforate.

At least the bracket 10 at the intake-end of the machine is provided with an annular air-baffle 32 which extends inwardly from the imperforate smaller-diameter peripheral portion 14, said air-baffle 32 terminating close to the outer shroud 29 of the end-to-end-flow blower-means 25.

The other bracket 11, at the exhaust-end of the machine, is preferably provided with an annular air-baffle 33, the inner end of which is beaded or otherwise rounded off, as indicated at 34, to follow, or approximately conform to, the flow-lines of the airflow, with a curvature such as to reduce the pressure-head necessary to maintain the airflow, as described and claimed in an application of Lee A. Kilgore, Serial No. 705,370, filed October 24, 1946, assigned to the Westinghouse Electric Corporation. In fact, all of the shrouds, blades, and baffles are designed in accordance with the airflow-principles described and claimed in the Kilgore application.

In operation, the single-end ventilation consists of air which is admitted through the openings 31 in the bracket 10 and is drawn into the machine, by the fan-blades 28, and forced to flow axially through the stator-ducts 5, to the exhaust-end of the machine, where the air is exhausted through the openings 31 of the bracket 11. At the same time, the recirculating-blades 24 force air radially outwardly, in parallel to the air which is delivered by the end-to-end ventilating blades 28, thus increasing the velocity of airflow through the stator-ducts 5, this recirculated air being returned through the rotor-ducts 21.

It is an important feature of my invention that the air-velocity shall be higher, in the places where heat-transfer is desired, than in the places where there is no heat-transfer, or where the heat-transfer requirements are not critical. While I am not limited to any particular velocities or velocity-ranges, it may be mentioned that one embodiment of my invention provides for a velocity of 1320 feet per minute through the bracket-openings 31, a velocity of 2370 feet per minute in the annular spaces surrounding the end-turns 8 at each end of the machine, between said end-turns and the imperforate peripheral bracket-portion 14, a velocity of 1800 feet per minute in the stator-ducts 5, and a velocity of 1600 feet per minute in the rotor-ducts 21. It will be understood, of course, that these velocities may be changed, in accordance with the individual requirements of various machines. In general, it will be desirable for the high air-velocities, in the stator-ventilating ducts and in the annular spaces surrounding the end-turns, to be at least twenty to forty percent higher than the velocities through the bracket-openings.

Since the heat-dissipation from a given surface is approximately directly proportional to the air-velocity, it will be noted that my invention provides a means for obtaining a high velocity in the places where large heat-transfer is needed, without requiring a single-end-ventilating blower 25 which is called upon to deliver either a large volume of air or a large pressure-head. My parallel-directed recirculating-airflow so reduces the air-load requirements of the end-to-end flow blower 25, that the latter may be a small-diameter blower, which is less costly than a large-diameter blower, and is much more desirable from a manufacturing standpoint, because of the less careful handling which is required of rotors having small blowers, before the rotors are assembled in the machines in the course of manufacture.

Experience has shown, also, that my improved motor is relatively quiet in operation, while at the same time adequately meeting all temperature-requirements in protected motors having an unusually high rating, for any given frame-size.

While I have shown my motor in a single illustrative form of embodiment, in accordance with a particular design which seems to be preferable, at present, I wish it to be understood that the invention is not limited to the precise details of disclosure, and I desire that the appended claims shall be accorded the broadest interpretation consistent with their language.

I claim as my invention:

1. A dynamo-electric machine comprising a stator-member and a rotor-member, said stator-member having a stator-frame and a stator-core supported by the stator-frame, the stator-frame comprising an outer enclosure-member spaced radially from the major portion of the outer periphery of the stator-core and thus defining a plurality of axially extending stator-ventilating ducts which admit of an axial airflow over the stator-core from one end of the core to the other, and a stator-winding carried by the stator-core; two perforated brackets mounted on the stator-frame, one at each end; bearings carried by said perforated brackets; said rotor-member having a rotor-core having a plurality of axially extending rotor-ducts, and having a shaft which is supported by said bearings; characterized by said rotor-member having internal blower-means for producing an end-to-end flow of cooling air, entering the machine through one perforated bracket, passing through said axially extending stator-ventilating ducts, and leaving the machine through the other perforated bracket, and also having internal blower-means for recirculating air through the rotor-ducts and the same stator-ventilating ducts in such direction that both the end-to-end airflow and the recirculation are in the same direction in said stator-ventilating ducts.

2. The invention as defined in claim 1, characterized by the air-openings and ducts being so proportioned as to obtain low entrance and exit air-velocities through the bracket-perforations and high air-velocities in the stator-ventilating ducts and in the annular spaces surrounding the end-turns of the stator-winding, at each end of the machine, between said end-turns and the respective perforated brackets, the perforated brackets being imperforate in the peripheral portions surrounding said end-turns.

3. The invention as defined in claim 1, characterized by the air-openings and ducts being so proportioned as to obtain low entrance and exit air-velocities through the bracket-perforations and high air-velocities in the stator-ventilating ducts and in the annular spaces surrounding the end-turns of the stator-winding, at each end of the machine, between said end-turns and the respective perforated brackets, the perforated brackets being imperforate in the peripheral portions surrounding said end-turns, said high air-velocities being at least 20% higher than said low air-velocities.

4. The invention as defined in claim 1, characterized by the two rotor blower-means being mounted at only the air-inlet end of the machine.

5. The invention as defined in claim 1, characterized by the bracket-perforations being disposed near the bearings, the two rotor blower-means being mounted at only the air-inlet end of the machine, and each perforated bracket having an annular air-baffle extending inwardly from an imperforate peripheral portion thereof, each air-baffle being axially spaced from both the bracket-perforations and the stator-winding end-turns at its end of the machine.

6. The invention as defined in claim 1, characterized by the bracket-perforations being disposed near the bearings, the two rotor blower-means being mounted at only the air-inlet end of the machine, each perforated bracket having an annular air-baffle extending inwardly from an imperforate peripheral portion thereof, each air-baffle being axially spaced from both the bracket-perforations and the stator-winding end-turns at its end of the machine, and the air-openings and ducts being so proportioned as to obtain low entrance and exit air-velocities through the bracket-perforations and high air-velocities in the stator-ventilating ducts and in the annular spaces surrounding the end-turns of the stator-winding, at each end of the machine, between said end-turns and the respective perforated brackets, the perforated brackets being imperforate in the peripheral portions surrounding said end-turns.

7. The invention as defined in claim 1, characterized by the bracket-perforations being disposed near the bearings, the two rotor blower-means being mounted at only the air-inlet end of the machine, each perforated bracket having an annular air-baffle extending inwardly from an imperforate peripheral portion thereof, each air-baffle being axially spaced from both the bracket-perforations and the stator-winding end-turns at its end of the machine, and the air-openings and ducts being so proportioned as to obtain low entrance and exit air-velocities through the bracket-perforations and high air-velocities in the stator-ventilating ducts and in the annular spaces surrounding the end-turns of the stator-winding, at each end of the machine, between said end-turns and the respective perforated brackets, the perforated brackets being imperforate in the peripheral portions surrounding said end-turns, said high air-velocities being at least 20% higher than said low air-velocities.

8. The invention as defined in claim 1, characterized by the bracket-perforations being disposed near the bearings, the two rotor blower-means being mounted at only the air-inlet end of the machine, the end-to-end flow blower-means comprising a cast blower mounted on the shaft in spaced relation to the rotor-core and having an integral hub, an integral blade-supporting shroud, a plurality of integral blades carried thereby, and an integral outer shroud carried by the blades; and an annular air-baffle extending inwardly from an imperforate peripheral portion of the perforated bracket at the air-inlet end of the machine, said air-baffle terminating close to the outer shroud of the end-to-end-flow blower-means.

9. The invention as defined in claim 1, characterized by the rotor-core having a molecularly integral squirrel-cage winding, the recirculating blower-means comprising a plurality of axially extending recirculation-inducing blades which are molecularly integral with the squirrel-cage end-ring at the air-inlet end of the machine, and the end-to-end-flow blower-means comprising a cast blower mounted on the shaft and having an integral hub, an integral blade-supporting shroud, a plurality of integral blades carried thereby, and an integral outer shroud carried by the blades, the peripheral portion of the blade-supporting shroud being close to the ends of the recirculation-inducing blades.

10. The invention as defined in claim 1, characterized by the bracket-perforations being disposed near the bearings, the rotor-core having a molecularly integral squirrel-cage winding, the recirculating blower-means comprising a plurality of axially extending recirculation-inducing blades which are molecularly integral with the squirrel-cage end-ring at the air-inlet end of the machine, and the end-to-end-flow blower-means comprising a cast blower mounted on the shaft and having an integral hub, an integral blade-supporting shroud, a plurality of integral blades carried thereby, and an integral outer shroud carried by the blades, the peripheral portion of the blade-supporting shroud being close to the ends of the recirculation-inducing blades; and an annular air-baffle extending inwardly from an imperforate peripheral portion of the perforated bracket at the air-inlet end of the machine, said air-baffle terminating close to the outer shroud of the end-to-end-flow blower-means.

WARD D. ABBOTT.

REFERENCES CITED

The following references are of record in the file of this patent:

UNITED STATES PATENTS

| Number | Name | Date |
|---|---|---|
| 1,320,781 | Mossay | Nov. 5, 1919 |
| 1,884,573 | Chapman | Oct. 25, 1932 |
| 2,238,925 | Brown | Aug. 22, 1941 |

FOREIGN PATENTS

| Number | Country | Date |
|---|---|---|
| 116,592 | Australia | Feb. 16, 1943 |